UNITED STATES PATENT OFFICE.

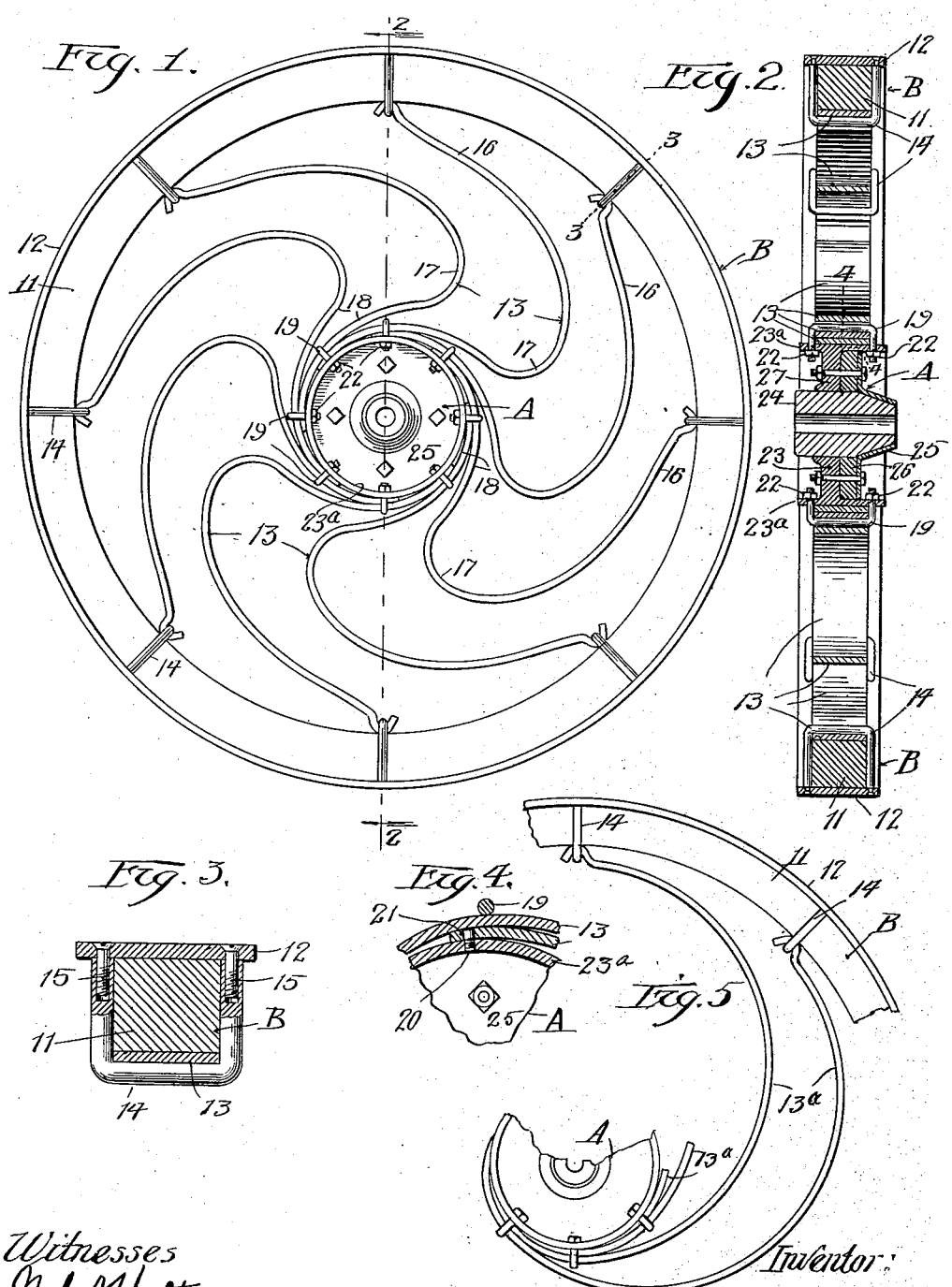

IVAR L. TVINDE, OF WATERTOWN, SOUTH DAKOTA.

VEHICLE-WHEEL.

1,017,236.  Specification of Letters Patent.  Patented Feb. 13, 1912.

Application filed March 9, 1911. Serial No. 613,419.

*To all whom it may concern:*

Be it known that I, IVAR L. TVINDE, a subject of the Kingdom of Norway, but having declared my intention to become a citizen of the United States of America, residing at Watertown, in the county of Codington and State of South Dakota, have invented new and useful Improvements in Vehicle-Wheels, of which the following is a specification.

This invention relates to vehicle wheels, and more particularly to that class of vehicle wheels having yielding means between the rim and hub whereby a cushioning effect is afforded.

The object of this invention is to produce a simple, practical and efficient wheel of this type, and to such ends this invention consists in the several novel features of construction, arrangement and combinations of parts hereinafter set forth and claimed.

The invention is illustrated in the drawing furnished herewith in which—

Figure 1 is a side elevation of a wheel embodying my improvements, Fig. 2 is a section taken on line 2—2, Fig. 1, Fig. 3 is a detail section taken on line 3—3 Fig. 1, Fig. 4 is a fragmental section taken on line 4—4 Fig. 2 and Fig. 5 is a fragmental side elevation of a modified form of the invention.

Referring to said drawing, A represents the hub of the wheel and B the rim which may comprise a felly 11, around which is secured a tire 12. The rim is connected to the hub by a plurality of flat spring spokes 13, arranged symmetrically around the hub of the wheel, each having a U bend intermediate the ends terminating in long sweeps running to the rim and hub, respectively. The outer ends of each spoke are secured to the rim by a U clip 14, which is shown as secured to the tire by screws 15, that pass through the tire and screw into the ends of the U clip. The outer ends of the spokes are of hook formation and hook over the adjacent clips 14 to form a hinge-like arrangement. Each spoke extends away from the rim on a curved line, substantially tangential with the inner face of the rim, as at 16, and approximately midway between its ends, the spoke is bent into a U form as at 17, from which point the spoke takes a curve, as at 18. The inner end of each spoke overlaps the next adjacent one and is shown as secured to the hub by U clips 19, each clip clamping the ends of two spokes upon the hub. If desired studs 20, may project out from the hub and enter holes 21, in the extreme end of the spokes to aid in preventing slipping thereof. The U clips 19, pass through an annular flange 23ᵃ, on the hub and have nuts 22, threaded upon their ends that bear against the inner face of the flange 23ᵃ. Said flange may be formed on a separate hub piece 23, secured on the central portion 24, of the hub and a facing 25, may be provided around the hub, said facing being bolted or otherwise secured to the portion 23. A filling block 26, is shown interposed between the web 27, of the hub portion 23, and the facing. The particular form of hub construction is not essential to this invention, broadly speaking, but serves for the purpose of illustration.

In the modified form shown in Fig. 5, the spokes 13ᵃ, are somewhat of a volute curve formation, arranged close together and running in the same general direction around the hub; they may be fastened in place by the same clamping means shown in Figs. 1 to 4.

The spring spokes being wide and formed of flat spring steel, cushion the hub from shocks caused by the unevenness of the road and being arranged uniformly around the hub in the same general direction, support the load without a great deal of deflection. Side twist is prevented by reason of the flat, wide strips of which the spokes are made.

The parts are of simple construction, easy to assemble, and capable of ready detachment.

I claim as new and desire to secure by Letters Patent:

In a vehicle wheel, the combination with a rim and a hub, of flat spring steel spokes, arranged around the hub, each spoke having a U shaped bend intermediate its ends and curved end portions that run to the rim and hub respectively, the outer end of each spoke having a hook formation arranged for pivotal connection with the rim, clips secured to the rim, one for each spoke, each clip having a round shank between which and the rim the hook of the spoke is confined in pivotal condition, and clips for securing the inner ends of the spokes upon the hub.

In witness whereof I have hereunto signed my name at Chicago, Cook county, Illinois, this 4th day of March 1911.

IVAR L. TVINDE.

Witnesses:
CHARLES O. SHERVEY,
FANNIE F. RICHARDS.

Copies of this patent may be obtained for five cents each, by addressing the "Commissioner of Patents, Washington, D. C."